United States Patent [19]

Borchardt et al.

[11] Patent Number: 4,558,741

[45] Date of Patent: Dec. 17, 1985

[54] METHODS OF MINIMIZING FINES MIGRATION IN SUBTERRANEAN FORMATIONS

[75] Inventors: John K. Borchardt; Bill M. Young, both of Duncan, Okla.

[73] Assignee: Halliburton Company, Duncan, Okla.

[21] Appl. No.: 584,379

[22] Filed: Feb. 28, 1984

[51] Int. Cl.[4] .................... C09K 17/00; E21B 43/22; E21B 43/26; E21B 43/27

[52] U.S. Cl. ..................................... 166/275; 106/900; 166/278; 166/294; 166/307; 166/308; 252/8.55 R; 252/8.55 C; 252/8.55 D; 405/264

[58] Field of Search ............... 166/271, 273, 274, 275, 166/276, 278, 294, 305 R, 307, 308; 252/8.55 R, 8.55 C, 8.55 D; 405/264; 106/900; 523/131, 132

[56] References Cited

U.S. PATENT DOCUMENTS

| | | | |
|---|---|---|---|
| 2,765,290 | 10/1956 | Ziegler | 106/900 X |
| 3,057,798 | 10/1962 | Knox | 252/8.55 C |
| 3,349,021 | 10/1967 | Krieg | 204/180 P |
| 3,434,971 | 3/1969 | Atkins | 166/307 X |
| 3,494,865 | 2/1970 | Andrews et al. | 252/8.55 R |
| 3,562,226 | 2/1971 | Gayley | 252/8.55 R |
| 3,704,750 | 12/1972 | Miles et al. | 166/308 X |
| 3,794,117 | 2/1974 | Knox et al. | 166/307 |
| 3,827,977 | 8/1974 | Miles | 252/8.55 B |
| 3,832,302 | 8/1974 | Lansford et al. | 166/300 X |
| 3,868,328 | 2/1975 | Boothe et al. | 252/8.55 C |
| 3,916,994 | 11/1975 | Maddox, Jr. et al. | 166/271 |
| 3,916,995 | 11/1975 | Shupe et al. | 166/271 |
| 3,916,996 | 11/1975 | Shupe et al. | 166/271 |
| 3,927,718 | 12/1975 | Tate et al. | 166/271 |
| 3,943,060 | 3/1976 | Martin et al. | 252/8.55 R |
| 3,962,332 | 6/1976 | Trapasso | 564/204 |
| 4,055,502 | 10/1977 | Swanson | 252/8.55 C |
| 4,062,796 | 12/1977 | Gardner et al. | 252/8.55 B X |
| 4,079,011 | 3/1978 | Tate | 252/8.55 C |
| 4,152,274 | 5/1979 | Phillips et al. | 252/8.55 R |
| 4,158,521 | 6/1979 | Anderson et al. | 405/264 |
| 4,200,151 | 4/1980 | Tate | 166/271 |
| 4,200,154 | 4/1980 | Tate | 166/307 |
| 4,206,058 | 6/1980 | Tate | 252/8.55 C |
| 4,366,071 | 12/1982 | McLaughlin et al. | 252/8.55 R |
| 4,366,072 | 12/1982 | McLaughlin et al. | 252/8.55 R |
| 4,366,073 | 12/1982 | McLaughlin et al. | 252/8.55 R |
| 4,366,074 | 12/1982 | McLaughlin et al. | 252/8.55 R |
| 4,374,739 | 2/1983 | McLaughlin et al. | 252/8.55 R |
| 4,393,939 | 7/1984 | Smith et al. | 166/293 |
| 4,447,342 | 5/1984 | Borchardt et al. | 252/8.55 D |
| 4,460,483 | 7/1984 | Weaver | 252/8.55 R |
| 4,462,718 | 7/1984 | McLaughlin et al. | 405/264 |

FOREIGN PATENT DOCUMENTS 2110744 6/1983 United Kingdom ........... 252/8.55 C

*Primary Examiner*—George A. Suchfield
*Attorney, Agent, or Firm*—Thomas R. Weaver; Edward F. Sherer

[57] ABSTRACT

A method of stabilizing fines within a permeable earthen formation comprising contacting the fines with an effective amount of an organic copolymer. The organic polymer has a noncationic character in a liquid media having a pH of 7 or above and therefore can be utilized with other cationic or anionic chemicals without forming damaging percipitates or decomposing during its use.

20 Claims, No Drawings

METHODS OF MINIMIZING FINES MIGRATION IN SUBTERRANEAN FORMATIONS

BACKGROUND OF THE INVENTION

A. Field of the Invention

This invention relates to a method of treating a permeable subterranean formation using water soluble organic polymers which are noncationic in character in a liquid media having a pH of 7 or above in order to stabilize in the formation migrating fines such as silica, iron minerals and alkaline earth metal carbonates.

B. Description of the Prior Art

The recovery of fluids such as oil and/or gas has been troublesome in areas wherein the subterranean formation is composed of one or more layers or zones which contain migrating fines such as silica, iron minerals, and alkaline earth metal carbonates. These fines tend to move or migrate to the well bore during the recovery of formation fluids from the particular layers or zones and frequently the migrating fine block the passageways leading to the well bore. Plugging or materially impairing the flow formation fluids towards the well bore results in a loss of these fluids to the producer or so decreases the rate of hydrocarbon recovery from the well as to cause the well to be shut down because it is economically unattractive to produce therefrom. An additional adverse factor resulting from the movement of the fines towards the well bore is that they are often carried along with the formation fluids to the well bore and pass through the pipes, pumps, etc., being used to recover the formation fluids to the surface with resulting damage to the moving parts thereof as the fines are very abrasive.

Secondary and tertiary methods of recovering hydrocarbons from a subterranean formation are well known. In general, such a method involves introducing a fluid, such as water, steam, etc., into one or more injection wells which penetrate the formation and forcing the fluid toward one or more offset production wells. Migrating fine particles during such an operation can cause a decrease of the rate in which fluid can be injected into the formation and can decrease the permeability or porosity of the formation which results in a decrease in the rate of hydrocarbon production at the offset production wells.

Migrating fine particles are frequently encountered during acidizing or fracturing operations and during sand consolidation operations. The presence of migrating fine particles during these operations can result in a decrease in the permeability of the formation which is being treated.

Gravel packing is a widely practiced method of preventing the production of sand from poorly consolidated formations. The migration of fine particles into the gravel pack can greatly reduce the permeability of the gravel pack. This can result in a decrease in the rate of production of hydrocarbons from the formation.

Consequently, in efforts to overcome these problems, various methods have been developed for treating a subterranean formation in order to stabilize portions in the formation containing migrating fines. For instance, U.S. Pat. Nos. 4,366,071; 4,366,072; 4,366,073; 4,366,074; and 4,374,739 disclose the use of organic polycationic polymers to prevent or reduce the ill effects of swelling clays and/or migrating fines in subterranean formations. These patents are assigned to the assignee of the present invention and are hereby incorporated by reference.

Organic polycationic polymers have become widely used in preventing permeability damage due to swelling clays and/or migrating fines which are contained within the subterranean formation. These organic polycationic polymers, however, can form precipitates when they come into contact with anionic chemicals such as anionic surfactants and other anionic chemicals used in hydrocarbon recovery. In the past, this problem has been reduced by using chemicals with the organic polycationic polymers which are nonionic or cationic in character in a liquid media. The use of these chemicals, however, can result in higher costs and/or reduced hydrocarbon recovery from a subterranean formation.

The present invention provides a method of stabilizing fines within a subterranean formation using an organic copolymer which overcomes or at least mitigates the above-described problems.

SUMMARY OF THE INVENTION

The present invention is a method of preventing or reducing the ill effects of migrating fines in an earthen formation such as a subterranean formation penetrated by a well bore. The method is carried out by contacting the fines in the earthen formation with an effective amount of a copolymer having a molecular weight of from about 1,000 to about 3,000,000 and having recurring structural monomer units linked in a random fashion and having the formula:

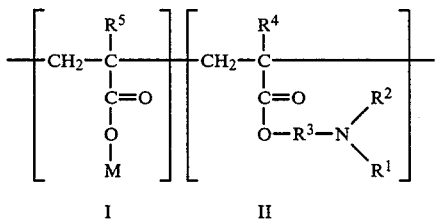

wherein
- $R^1$ and $R^2$ are independently methyl, ethyl, hydroxyethyl or hydroxymethyl;
- $R^3$ is an unsubstituted alkylene group having from about 2 to about 4 carbon atoms or a substituted alkylene group having from about 2 to about 4 carbon atoms and containing a hydroxy group,
- $R^4$ is methyl or ethyl;
- $R^5$ is hydrogen or methyl;
- M is hydrogen or an alkali metal such as sodium or potassium; and,
- monomer unit I is present in the range of from about 5 to about 30 weight percent of the copolymer and monomer unit II is present in the range of from about 70 to about 95 percent by weight of the copolymer.

Monomer units I and II are linked together in a random sequence along the copolymer chain.

The organic copolymers used in the method of the invention are very effective in treating fines such as silica, iron minerals such as hematite, magnetite, lepidocrocite, wuestite, akaganeite, and siderite, and alkaline earth metal carbonates such as calcite and dolomite. A treatment with the organic copolymers of the present invention is essentially permanent and the copolymers are very resistant to being removed by brines, oils, or acids. Formations exhibit high permeability retention after the fines of the formation have been treated with the organic copolymers. Furthermore, the copolymers are very effective over a wide range of temperatures and are particularly effective from about 76° F. to about 560° F. No well shut-in time is required when the organic copolymers are used to carry out the method of the invention. In addition, the organic copolymers of the present invention, which are noncationic in character in a liquid media having a pH of 7 or above, will not react with anionic chemicals which may be used with organic copolymers and are therefore compatible with anionic, nonionic, and cationic chemicals at acidic, basic, and neutral pH conditions. The organic copolymers will not precipitate or decompose when they are in the presence of the anionic, nonionic and/or cationic chemicals.

DETAILED DESCRIPTION OF THE INVENTION

The present invention involves the use of organic copolymers, which are noncationic in character in a liquid media having a pH of 7 or above, to stabilize fines contained in the formation. These fines may or may not be present with clay minerals. The organic copolymers which are suitable for use in the present invention have a molecular weight of from about 1,000 to about 3,000,000 and have recurring structural monomer units formed in a random fashion of the formula:

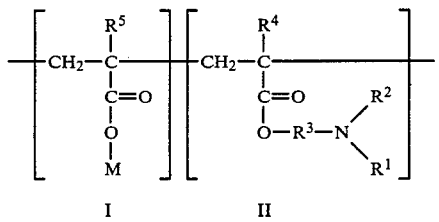

$R^1$ and $R^2$ are independently methyl, ethyl, hydroxyethyl or hydroxymethyl;

$R^3$ is an unsubstituted alkylene group having from about 2 to about 4 carbon atoms or a substituted alkylene group having from about 2 to about 4 carbon atoms and containing a hydroxy group, $R^4$ is methyl or ethyl;

$R^5$ is hydrogen or methyl;

M is hydrogen or an alkali metal such as sodium or potassium;

and, monomer unit I is present in the range of from about 5 to about 30 weight percent of the copolymer and monomer unit II is present in the range of from about 70 to about 95 percent by weight of the copolymer.

The organic copolymers of the present invention can be used to treat both natural and artificial structures which are permeable, including poorly consolidated and unconsolidated rocks. The method of the invention is particularly suited for stabilizing fine particles having a diameter of less than 10 microns. Furthermore, there is a wide range of applications for the organic copolymers. These applications involve using the organic copolymers alone, as the primary treating agent, or as an auxiliary in other treatments.

Although the invention is not limited to any particular theory of operation, it is believed that when the copolymer is in the presence of an anionic and/or nonionic chemical at a pH of 7 or above, the nonionic chemical and copolymer have a neutral electronic charge and the anionic chemical has a negative electronic charge. Therefore, the anionic chemical and nonionic chemical will not react with the copolymer because the copolymer has an electronic charge which is nonreactive with the electron charge of the anionic chemical and nonionic chemical. At a pH of less than 7, the nonionic and anionic chemicals have a neutral electronic charge and will not react with the copolymer which may have a positive electronic charge due to protonation.

Examples of monomer unit I which are suitable in the method of the present invention include methyacrylic acid, the sodium and potassium salts of methacrylic acid, acrylic acid, the sodium and potassium salts of acrylic acid and mixtures thereof.

Examples of monomer unit II which are suitable in the method of the present invention include: dimethylaminoethyl methacrylate, diethylaminomethyl methacrylate, dimethylaminopropyl methacrylate, diethylaminoethyl methacrylate, dimethylaminomethyl methacrylate, diethylaminoethyl acrylate, diethylaminomethyl acrylate, dimethylaminopropyl acrylate and mixtures thereof.

A particularly preferred copolymer which is suitable for use in the present invention comprises a copolymer having a molecular weight of about 1,000,000 and having recurring structural monomer units linked in a random fashion and having the general formula:

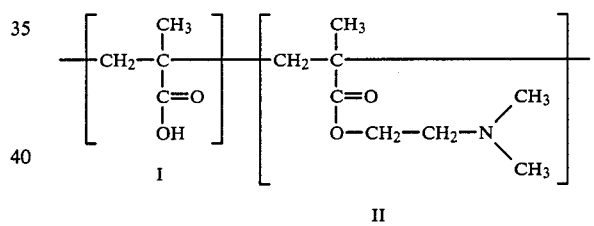

wherein monomer unit I is present in the range of about 30 percent by weight of the copolymer and monomer unit II is present in the range of about 70 percent by weight of the copolymer.

The organic copolymers of the present invention should have a molecular weight of from about 1,000 to about 3,000,000. Preferably the organic copolymers have a molecular weight of about 1,000,000. The molecular weight of the organic copolymers used in the method of the present invention will vary over a wide range depending upon the permeability of the formation to be treated and the copolymer utilized in the method of the invention.

The amounts of organic copolymers employed in the method of the present invention will vary according to, for example, the size and porosity of the particular formation and the type of fines present. Therefore, there are no upper or lower limits in this regard.

Any suitable method of application can be used to carry out the method of the invention. For some applications such as surface or exposed structures, it may be desirable to merely spray the polymer onto the permeable mass. The essential feature is contact between the fines to be treated and the copolymer.

When a carrier fluid is used to carry out the method of the invention, the organic polymers will generally be present in the carrier fluid in a concentration within the range of from about 0.01 to about 5% by weight of the carrier fluid. Lower or higher concentrations can be used, but are not generally as practical. When a carrier fluid is used, the preferred concentration of the organic polymers is in the range of from about 0.25 to about 1.00% by weight of the carrier fluid.

Carrier fluids which can be used to carry out the method of the present invention include polar and nonpolar fluids. Examples of suitable fluids are water, brine, and aqueous mixtures of low molecular weight alcohols. Examples of suitable low molecular weight alcohols include methanol, ethanol, and isopropanol. When water is used as the carrier fluid, the carrier fluid can contain other ingredients which do not substantially interfere with the dispersion or dissolution of the polymer in the carrier fluid. Furthermore, the water can be gelled or thickened for certain applications. Examples of ingredients which can be included in the water include salts, mineral acids, low molecular weight organic acids, cationic nonionic, or anionic surfactants, and wetting agents. Preferably, the carrier fluid has a boiling point in the range of from about 25° C. to about 200° C. and a viscosity of less than 10 centipoise. Higher viscosity fluids may be used in certain applications but are not generally very practical due to the pressure and pumping requirements.

A preferred aqueous carrier fluid is a saline solution containing about 0.1 to about 40 percent by weight of salt. The preferred salt concentration is about 2 to about 12% by weight of the solution. The salt can be an alkali metal salt, alkaline earth metal salt, an ammonium salt or mixtures thereof. Suitable anions include halides, such as chloride, bromide, iodide, and fluoride, sulfates, carbonates, hydroxides, or mixtures thereof. The halides of potassium, sodium, magnesium, calcium, and ammonium and mixtures thereof are preferred due to the economics and solubility. Aqueous acids having a concentration of about 0.1 to about 40% by weight of the solution can also be utilized in carrying out the method of the invention. Examples of suitable acids include hydrochloric acid, hydrofluoric acid, phosphoric acid, acetic acid, formic acid, citric acid, and mixtures thereof. The preferred acids include about 3 to about 15% by weight of hydrochloric acid and a mixture of about 12 to about 15% by weight of hydrochloric acid, about 1% by weight acetic acid and about 0.6% by weight citric acid.

The method of the present invention can be used with a number of operations. For instance, the method of the present invention can be used in conjunction with sand consolidation procedures, gravel or sand packing procedures, secondary recovery operations, and acidizing or fracturing operations. In these operations, the organic polymers can be used to prevent or reduce the migration of fines in the subterranean formation. This results in a greater increase of permeability in the formation.

The present invention is further exemplified by the examples below which are presented to illustrate certain specific embodiments of this invention, but are not intended to be construed so as to be restrictive of the spirit and scope thereof.

EXAMPLES

A. Polymers Tested

A series of copolymers comprising dimethylaminoethyl methacrylate, which corresponds to monomer unit II, and methacrylic acid, which corresponds to monomer unit I, were tested as silicon fine stabilizers. The copolymers contained varying proportions of the two monomer units and varied in molecular weight. The copolymers used in the tests are set forth below in Table I.

TABLE I

| Copolymer Designation | Weight Percent (monomer I) | Weight Percent (monomer II) | Approx. Molecular Weight of Copolymer |
|---|---|---|---|
| A | 5 | 95 | 300,000 |
| B | 5 | 95 | 500,000 |
| C | 5 | 95 | 1,000,000 |
| D | 30 | 70 | 1,000,000 |
| E | 30 | 70 | >1,000,000 |
| F | 30 | 70 | 200,000 |
| G | 5 | 95 | 100,000 |

B. Test Equipment and Procedure

The test equipment used in the tests was a TEFLON sleeved test chamber having a diameter of about 2.32 cm. at the bottom of the chamber and a diameter of about 2.54 cm. at the top of the chamber. The chamber design insured that under modest applied pressure, fluids injected during the test would flow through the test sand rather than around the test sand. The test sand comprised 100 grams of a mixture of 85 percent by weight 70–170 U.S. mesh sand and 15 percent by weight ground silica flour particles sieved through a 325 U.S. mesh screen. The median particle diameter of the silica particles was 22.4 micrometers. A 100 U.S. mesh screen was placed at the base of the chamber to hold the larger particles in place. 7.5 grams of 20–40 U.S. mesh sand was placed on the mixture at the top of the chamber to minimize the effects of turbulence during the initial fluid injection.

The test chamber and a fluid reservoir were heated to about 145° F. The first fluid injected into the top of the chamber during the test comprised 236 cc. of an aqueous solution containing 2% by weight ammonium chloride and various concentrations of the copolymer. Included in these tests was a treatment in which no copolymer was added to the fluid. The injection pressure of the fluid was 5 psia. Fresh water was then injected into the top of the chamber at a pressure of 4 psig. The volume of the fresh water was 500 cc., which equaled about 30 pore volumes. The fresh water treatment was followed by an injection at 40 psig of 400 cc. (24 pore volumes) of an aqueous solution comprising 15 percent by weight hydrochloric acid followed by the injection at 40 psig of 500 cc. (30 pore volumes) of fresh water.

The effluent of each treatment was collected and filtered through a tared piece of 0.45 micron filter paper. The solids from the effluent were collected on a filter paper, dried, and weighed. Tests 7 and 8 were carried out at 200° F. rather than 145° F. The results of these tests are shown in Table II.

TABLE II

| Test No. | Copolymer Used | Copolymer Concentration In Treating Fluid (Weight %) | Silica Fines Production (grams) | | | |
|---|---|---|---|---|---|---|
| | | | Fresh Water | 15% HCl | Fresh Water | Total |
| 1 | none | 0.00 | 0.21 | 0.05 | 0.08 | 0.34 |
| 2 | A | 0.19 | 0.02 | 0.07 | 0.08 | 0.17 |
| 3 | B | 0.19 | 0.03 | 0.06 | 0.06 | 0.15 |
| 4 | C | 0.19 | 0.02 | 0.05 | 0.09 | 0.16 |
| 5 | D | 0.19 | 0.01 | 0.01 | 0.09 | 0.11 |
| 6 | E | 0.45 | 0.03 | 0.04 | 0.10 | 0.17 |
| 7 | F | 0.40 | 0.01 | 0.03 | 0.04 | 0.08 |
| 8 | F | 0.40 | 0.08 | 0.03 | 0.03 | 0.14 |
| 9 | G | 0.20 | 0.05 | 0.06 | 0.04 | 0.15 |
| 10 | G | 0.45 | 0.02 | 0.06 | 0.04 | 0.12 |

The results of the tests show that the copolymers used in the method of the invention are effective in substantially reducing the migration of silica fines.

Long term flow tests were performed to determine the permanency of the copolymers in stabilizing silica fines. The test equipment, test sand, test conditions and test procedure were identical to the tests previously described. After the injection of 236 cc. of a fluid comprising 2 percent ammonium chloride and the various concentrations of the copolymer into the test chamber, about 48 gallons of fresh water (about 10,000 pore volumes) were injected at a pressure of 40 psig. The results of these tests are shown in Table III.

TABLE III

| Test No. | Copolymer Used | Copolymer Concentration In Treating Fluid (Weight %) | Pore Volumes Fresh Water Injected | Total Silica Fines Produced (grams) |
|---|---|---|---|---|
| 1 | none | 0.00 | 10,467 | 1.31 |
| 2 | C | 0.19 | 10,015 | 0.78 |
| 3 | D | 0.20 | 10,502 | 0.72 |
| 4 | G | 0.45 | 10,041 | 0.28 |

The results of the test show that the copolymers were very effective in substantially reducing silica fine production.

The invention is not limited to the above-described specific embodiments thereof; it must be understood therefore, that the detail involved in the descriptions of these embodiments is presented for the purposes of illustration only, and that reasonable variation and modifications which will be apparent to those skilled in the art, can be made of this invention without departing from the spirit and scope thereof:

What is claimed is:

1. A method of preventing or reducing the migration of fines in a permeable earthen formation comprising:
   contacting said fines with an effective amount of an organic copolymer having a molecular weight of from about 1,000 to about 3,000,000 and having recurring structural monomer units formed in a random fashion of the formula:

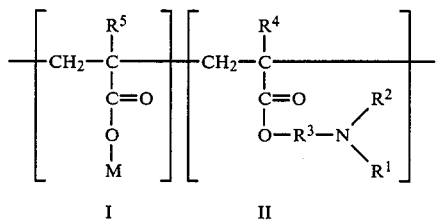

$R^1$ and $R^2$ are independently methyl, ethyl, hydroxyethyl or hydroxymethyl;

$R^3$ is an unsubstituted alkylene group having from about 2 to about 4 carbon atoms or a substituted alkylene group having from about 2 to about 4 carbon atoms and containing a hydroxy group;

$R^4$ is methyl or ethyl;

$R^5$ is hydrogen or methyl;

M is hydrogen or an alkali metal;

and, monomer unit I is present in the range of from about 5 to about 30 weight percent of the copolymer and monomer unit II is present in the range of from about 70 to about 95 percent by weight of the copolymer.

2. The method recited in claim 1 wherein monomer unit I is selected from the group consisting of methacrylic acid, acrylic acid, the sodium salt of methacrylic acid, the sodium salt of acrylic acid, the potassium salt of acrylic acid, the potassium salt of methacrylic acid, and mixtures thereof.

3. The method recited in claim 2 wherein monomer unit II is selected from the group consisting of dimethylaminoethyl methacrylate, diethylaminomethyl methacrylate, dimethylaminopropyl methacrylate, diethylaminoethyl methacrylate, dimethylaminomethyl methacrylate, diethylaminoethyl acrylate, diethylaminomethyl acrylate, dimethylaminopropyl acrylate and mixtures thereof.

4. The method recited in claim 3 wherein said earthen formation is a subterranean formation.

5. The method recited in claim 1 wherein said fines are selected from the group consisting of silica, iron minerals, alkaline earth metal carbonates and mixtures thereof.

6. The method recited in claim 1 wherein said molecular weight is about 1,000,000.

7. The method recited in claim 1 wherein said copolymer is dispersed in a carrier fluid.

8. The method recited in claim 7 wherein said carrier fluid comprises from about 0.1 to about 40.0 percent by weight of a salt and said salt is selected from the group consisting of halide, an alkaline earth metal halide, an ammonium halide, and mixtures thereof.

9. The method recited in claim 8 wherein said copolymer is present in said carrier fluid in the range of from about 0.01 to about 5.0 percent by weight of the carrier fluid.

10. The method recited in claim 8 wherein said carrier fluid further comprises a compound selected from the group consisting of a mineral acid, a low molecular weight organic acid, a surfactant, and mixtures thereof.

11. The method recited in claim 10 wherein said fines have a diameter of less than 10 microns.

12. The method recited in claim 1 wherein said method is used in conjunction with a secondary recovery operation.

13. The method recited in claim 1 wherein organic copolymer has the formula:

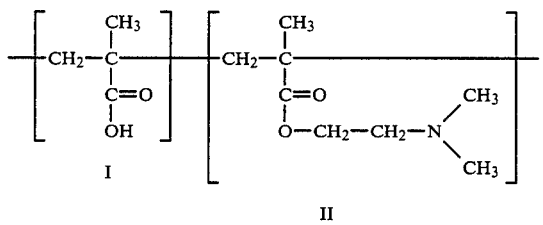

wherein monomer unit I is present in the range of about 30 percent by weight of the copolymer and monomer unit II is present in the range of about 70 percent by weight of the copolymer and the copolymer has a molecular weight of about 1,000,000.

14. A method of stabilizing fines within an earthen formation comprising:
contacting said formation with an effective amount of an organic copolymer having a molecular weight of from about 1,000 to about 3,000,000 and having recurring structural monomer units formed in a random fashion of the formula:

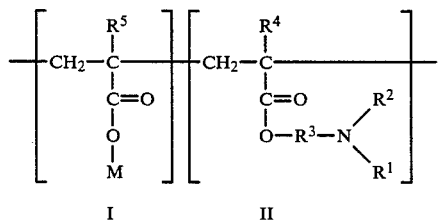

wherein
$R^1$ and $R^2$ are independently methyl, ethyl, hydroxyethyl or hydroxymethyl;
$R^3$ is an unsubstituted alkylene group having from about 2 to about 4 carbon atoms or a substituted alkylene group having from about 2 to about 4 carbon atoms and containing a hydroxy group;
$R^4$ is methyl or ethyl;
$R^5$ is hydrogen or methyl;
M is a hydrogen or an alkali metal;
and,
monomer unit I is present in the range of from about 5 to about 30 percent by weight of the copolymer and monomer unit II is present in the range of from about 70 to about 95 percent by weight of the copolymer.

15. The method recited in claim 14 wherein monomer unit I is selected from the group consisting of methacrylic acid, acrylic acid, the sodium salt of methacrylic acid, the sodium salt of acrylic acid, the potassium salt of acrylic acid, the potassium salt of methyacrylic acid, and mixtures thereof.

16. The method recited in claim 15 wherein monomer unit II is selected from the group consisting of dimethylaminoethyl methacrylate, diethylaminomethyl methacrylate, dimethylaminopropyl methacrylate, diethylaminoethyl methacrylate, dimethylaminomethyl methacrylate, diethylaminoethyl acrylate, diethylaminomethyl acrylate, dimethylaminopropyl acrylate and mixtures thereof.

17. The method recited in claim 14 wherein said fines are selected from the group consisting of silica, iron minerals, alkaline earth metal carbonates and mixtures thereof.

18. The method recited in claim 14 wherein the organic copolymer has the formula:

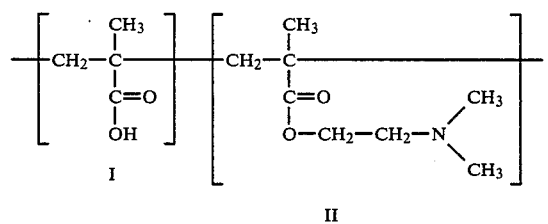

wherein monomer unit I is present in the range of about 30 percent by weight of the copolymer monomer unit II is present in the range of about 70 percent by weight of the copolymer and the copolymer has a molecular weight of about 1,000,000.

19. The method recited in claim 18 wherein said copolymer is dispersed in a carrier fluid and the carrier fluid comprises from about 0.1 to about 40.0 percent by weight of a salt and said salt is selected from the group consisting of an alkali metal halide, an alkaline earth metal halide, an ammonium halide, and mixtures thereof.

20. The method recited in claim 19 wherein said copolymer is present in said carrier fluid in the range of from about 0.01 to about 5.0 percent by weight of the carrier fluid.

* * * * *